United States Patent
Hass et al.

(10) Patent No.: US 7,123,587 B1
(45) Date of Patent: Oct. 17, 2006

(54) SYSTEM, DEVICE AND METHOD FOR LIMITING TUNNEL TRAFFIC IN AN INFORMATION COMMUNICATION NETWORK

(75) Inventors: Barry L. Hass, Auburndale, MA (US); Donald Fedyk, Groton, MA (US)

(73) Assignee: Nortel Networks Limited (CA)

( * ) Notice: Subject to any disclaimer, the term of this patent is extended or adjusted under 35 U.S.C. 154(b) by 1049 days.

(21) Appl. No.: 09/721,488

(22) Filed: Nov. 22, 2000

(51) Int. Cl.
*G01R 31/08* (2006.01)
*H04L 12/28* (2006.01)
*G06F 15/173* (2006.01)

(52) U.S. Cl. .................. 370/238; 370/401; 709/241
(58) Field of Classification Search .................. None
See application file for complete search history.

(56) References Cited

U.S. PATENT DOCUMENTS

| | | | | |
|---|---|---|---|---|
| 5,870,386 | A * | 2/1999 | Perlman et al. | 370/256 |
| 5,987,259 | A * | 11/1999 | Goebel | 717/152 |
| 6,496,491 | B1 * | 12/2002 | Chuah et al. | 370/331 |
| 6,519,254 | B1 * | 2/2003 | Chuah et al. | 370/389 |
| 6,665,273 | B1 * | 12/2003 | Goguen et al. | 370/252 |
| 6,751,190 | B1 * | 6/2004 | Swallow | 370/217 |

OTHER PUBLICATIONS

Andersson et al., "LDP Specification", Network Working Group Internet Draft, May 1999.

Rosen et al., "Multiprotcol Label Switching Architecture", Network Working Group Internet Draft, Aug. 1999.
Callon et al. "A Framework for Multiprotocol Label Switching" IETF Draft, Sep. 1999.
Shen et al., "Calculating IGP Routes Over Traffic Engineering Tunnels" Network Working Group Internet Draft, Dec. 1999.

* cited by examiner

*Primary Examiner*—Ricky Q. Ngo
*Assistant Examiner*—Cynthia L. Davis
(74) *Attorney, Agent, or Firm*—McGuinness & Manaras LLP

(57) ABSTRACT

There is disclosed an apparatus and method for limiting tunnel traffic in a network. Traffic engineering tunnels are used to direct traffic along a predefined path, which may differ from the path that internet protocol (IP) routing would determine. Interior gateway protocol (IGP) cut through will allow the forwarding of all destinations downstream of a tunnel through the tunnel, without the operator needing to specify a forwarding equivalence class (FEC). But congestion in the tunnel and network instability may result from this approach. A solution to these problems is disclosed which limits the traffic in the tunnel to only that with destination addresses of the tunnel's egress router or nodes directly supported thereby. Other solutions are disclosed which allow tunnel traffic to nodes having destination addresses other than those being directly supported by the tunnel's egress router. All of these solutions are achieved in both pre-determined forwarding entry and dynamic packet-by packet embodiments.

69 Claims, 6 Drawing Sheets

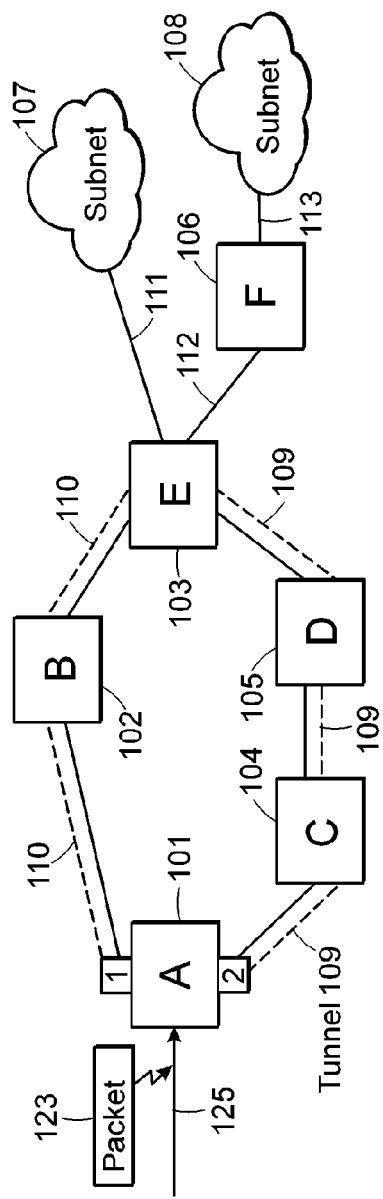

| Packet No. | Forwarding Entry | | |
|---|---|---|---|
| | Destination Address | Outgoing Interface | Label Added? |
| 114 | Subnet 107 | 2 | Yes |
| 115 | Subnet 107 | 2 | Yes |
| 116 | Subnet 107 | 2 | Yes |
| 117 | Subnet 108 | 2 | Yes |
| 118 | Subnet 107 | 2 | Yes |
| 119 | Subnet 108 | 2 | Yes |
| 120 | Subnet 108 | 2 | Yes |
| 121 | Router E103 | 2 | Yes |
| 122 | Router F106 | 2 | Yes |
| . | | | |
| . | | | |
| . | | | |

FIG. 2B
Prior Art

| Packet No. | Forwarding Entry | | |
|---|---|---|---|
| | Destination Address | Outgoing Interface | Label Added? |
| 114 | Subnet 107 | 2 | Yes |
| 115 | Subnet 107 | 2 | Yes |
| 116 | Subnet 107 | 2 | Yes |
| 117 | Subnet 108 | 1 | No |
| 118 | Subnet 107 | 2 | Yes |
| 119 | Subnet 108 | 1 | No |
| 120 | Subnet 108 | 1 | No |
| 121 | Router E103 | 2 | Yes |
| 122 | Router F106 | 2 | Yes |
| . | | | |
| . | | | |
| . | | | |

FIG. 2C

SYSTEM, DEVICE AND METHOD FOR LIMITING TUNNEL TRAFFIC IN AN INFORMATION COMMUNICATION NETWORK

FIELD OF THE INVENTION

The present invention relates generally to information communication networks and, more particularly, relates to limiting tunnel traffic in such networks.

BACKGROUND OF THE INVENTION

Computer networks are having more and more of an impact on human interaction with the passage of time. For one example, the Internet, which is currently used by only about 5% of worldwide human population, is being recognized as a boon to mankind. Accordingly, the Internet, is rapidly growing in usage on a global basis, is bringing a vast array of useful information to those members of our global village who are Internet users, and is fostering communication between diverse cultures located around the globe by way of the email system. As is widely known, the Internet has its foundation in globally-deployed computer networks. For other examples, one could cite rapidly growing non-Internet local area network (LAN) usages of computer networks in industry, academia, government, and elsewhere. Accordingly, information (traffic) on all of these networks is building at an accelerating pace which is creating an urgent need for finding additional solutions to network traffic congestion and traffic-induced network-instability problems.

One such solution involves the use of what is known in the art as "tunnels". These are computer software/protocol network-constructs which typically employ "labels" as in the multi protocol label system (MPLS). For example, these labels can override destination addresses in the headers of network information or data packets received at a router. This router may be the input router to a particular tunnel, where the labels allow forwarding such network information or messages or binary-styled data packets from the input router via the tunnel to its exit located on its tail-end router or network device. These tunnels can provide rapid movement of traffic from entrance to exit devices, thus reducing the handling of this traffic at every network device or node therebetween and speeding-up the process of communication. In other words, traffic engineering tunnels are used to direct traffic along a predefined path, which may differ from the path that IP routing (Internet Protocol routing) would have otherwise determined. This one network feature, tunneling, can thus be a step in the right direction with regard to solving or managing the increasing network traffic problem.

However, tunnels have certain limitations. One of the problems with tunneling is that it can cause network instability as it is being incorporated is into a network. For example, consider a tunnel being created between an ingress or head-end router and an egress or tail-end router in a network having a number of other routers, switches, and other network nodes with links connecting all devices. Traffic that is upstream of the tunnel's ingress router and destined for routers downstream of the tunnel's egress router will be directed towards the ingress router to try to get a "quick ride through the tunnel". This creates an instability in the network since traffic across the network, which otherwise would or should have been generally uniformly distributed, is being subjected to a perturbation caused by a single tunnel being introduced into the network and attracting traffic to its head-end. In other words, normally when an MPLS Traffic Engineering (TE) tunnel is created, it causes an aggregation of traffic to the tunnel's tail-end router, since the newly created tunnel appears to be the best path to all destinations beyond the tail-end router. In many cases this is not desirable. When initially configuring MPLS TE tunnels, there is a problem with network stability; but, once tunnels are configured everywhere the problem is reduced. An approach to a solution to this instability problem is to try to (1) introduce a plurality of tunnels in a generally uniformly-distributed manner throughout the network and (2) introduce them all generally at the same time. If successful, under these circumstances, the above-noted instabilities can be reduced and might be avoided. However, this approach is not without frustration because it can be a challenging problem to uniformly introduce a plurality of tunnels into and across a complex network at approximately the same time.

Another problem with tunneling and related to the scenario just described is a traffic congestion problem within the tunnel itself. This problem is created when all or most of traffic upstream of the tunnel's head-end router that is destined for network devices or other nodes downstream of the tunnel's tail-end router would like to use the tunnel to get there. Under these circumstances, traffic-handling capacity of the tunnel can quickly be exceeded and congestion and delay, including loss of information, can result. This problem occurs frequently when using current protocols such as, for example, a currently-popular network protocol known as "Interior Gateway Protocol (IGP) cut through". IGP cut through is used within local area networks (LANs) or within autonomous systems (ASs) [to be contrasted with wide area networks (WANs) which connect one or more LANs or ASs via gateways]. IGP cut through is described in an IETF (Internet Engineering Task Force) draft entitled "Calculating IGP Routes Over Traffic Engineering Tunnels", is available on line at "draft-hsmit-mpls-igp-spf-00.txt", was authored by Messrs. Henk Smit and Naiming Shen and published in June, 1999, and is incorporated by reference herein in its entirety. The main advantage of IGP cut through is that packets with destination addresses downstream of the egress router of a tunnel will automatically use the tunnel without a human operator needing to specify those destinations as part of a forwarding equivalency class (FEC). Thus, all destinations downstream of the tunnel's exit become part of an implied FEC (IFEC). But, using IGP cut through causes the human operator to lose his/her ability to direct traffic through the tunnel which can result in a problem of severe tunnel traffic congestion.

These problems of network instability and tunnel congestion are addressed by the welcome arrival of the present invention which not only offers a solution to these problems but does so while also allowing continued usage of the popular IGP cut through protocol.

SUMMARY OF THE INVENTION

Embodiments of the present invention include methodology, apparatus and/or computer program product for limiting traffic volume in a tunnel in an information communication network. Such traffic volume limiting initially involves establishing a tunnel between a head-end router and a tail-end router in the network and then determining which network devices are directly-connected to the tail-end router. Then such traffic volume limiting involves routing certain information destined for such directly-connected network devices from head-end router to tail-end router through the tunnel. Accordingly, other information not destined for directly-connected network devices is not routed through the tunnel thereby limiting traffic volume in the tunnel.

In another aspect of the present invention the tunnel is a traffic engineered MPLS tunnel and routing of that certain information includes affixing a label to that certain information identifying the tail-end router as its destination, thereby allowing any transit routers in the tunnel to switch-forward that certain information based solely on the destination on the label. This reduces the processing load on those transit routers, freeing-up such transit routers for other tasks as may be needed and speeding-up transit time for that certain information through the tunnel. The tail-end router removes the label and forwards that certain information based on destination addresses contained in that certain information to hosts and subnets directly connected from and supported by the tail-end router.

In yet another aspect of the present invention the head-end router includes a link state database allowing such router to determine the network devices to which its tail-end router is directly and indirectly connected. The information destined for other than such directly-connected hosts and subnets is routed by routes other than through the tunnel.

Alternative embodiments of the present invention include limiting traffic in the tunnel by defining subsets of traffic received by the head-end router and forwarding over or through the tunnel at least one of those subsets. In particular implementations, subsets forwarded over the tunnel are destined for the tail-end router or for nodes or devices directly served (one hop in certain protocols) by the tail-end router.

Further alternative embodiments include limiting traffic in a multiplicity of tunnels extending from the head-end router by defining a like multiplicity of subsets of traffic received by the head-end router and forwarding each one of those subsets over a different one of the tunnels. In particular implementations, subsets forwarded over the tunnels are destined for respective tail-end routers or for nodes or devices directly served (one hop in certain protocols) by those tail-end routers.

In a system aspect of the present invention for controlling traffic in a network, determination logic is operatively coupled within the network employing an appropriate protocol to determine a first subset of network devices which are no more than a selected number of hops (N hops) away from the tail-end router. The head-end router forwards over the tunnel a second subset of traffic destined for the tail-end router and/or the first subset of network devices or any one or more of these devices. In a further feature, control logic measures level or volume of traffic in the tunnel and adjusts the level or volume by changing the number (N) of hops in, and therefore the number of network devices in, the first subset.

In another system aspect of the present invention for limiting traffic in an information communication network, a subset of additional network devices directly supported by or within N-hops from the tail-end router is determined. Then by using the Dijkstra algorithm or by other ways the shortest path from the head-end router to each node or device in the subset is determined. Thereafter, any tunnels connected from the head-end router to any of these nodes or devices having a metric less than its corresponding shortest path is determined. And, entries in the head-end router's router or forwarding table are filled with any tunnel or tunnels shorter than any of their corresponding shortest paths, but only with those having the minimum metric. In a further feature, absent any tunnel or tunnels shorter than any of their corresponding shortest paths, entries in the table are filled with any tunnel or tunnels equal to their corresponding shortest paths. In yet a further feature, absent any of the above-mentioned tunnels, entries in the table are filled with neighbor nodes forming route(s) having the minimum metric or shortest path.

It is therefore advantageous and beneficial to employ the present invention in computer networks in which tunnels are utilized, to avoid destabilization and congestion problems associated with those tunnels that otherwise do not limit their respective traffic levels or volumes, whereby overall speed and efficiency of communication in the network is enhanced.

BRIEF DESCRIPTION OF THE DRAWINGS

The foregoing and other objects and advantages of the invention will be appreciated more fully from the following further description thereof with reference to the accompanying drawings wherein:

FIG. 1 is a schematic diagram of an information communication network illustrating both multiple routes between a tunnel's head-end and tail-end routers and a plurality of network devices directly and indirectly supported by the tail-end router, and in which embodiments of the present invention can be used to advantage;

FIG. 2A is a schematic diagram of information or data packets received by tunnel head-end router A101 of FIG. 1;

FIG. 2B is a prior art illustration of a head-end or ingress router's map table or routing table or forwarding entry table in which destination addresses of incoming packets of information and/or data are mapped to particular outgoing interfaces or ports on such router;

FIG. 2C is an illustration of a head-end or ingress-router's map table or routing table or forwarding entry table filled with table entries in conformance with an embodiment of the present invention in which destination addresses of certain subsets of traffic or incoming packets of information and/or data are mapped to particular outgoing interfaces or ports on such router;

DETAILED DESCRIPTION OF A PREFERRED EMBODIMENT

Figure 3:
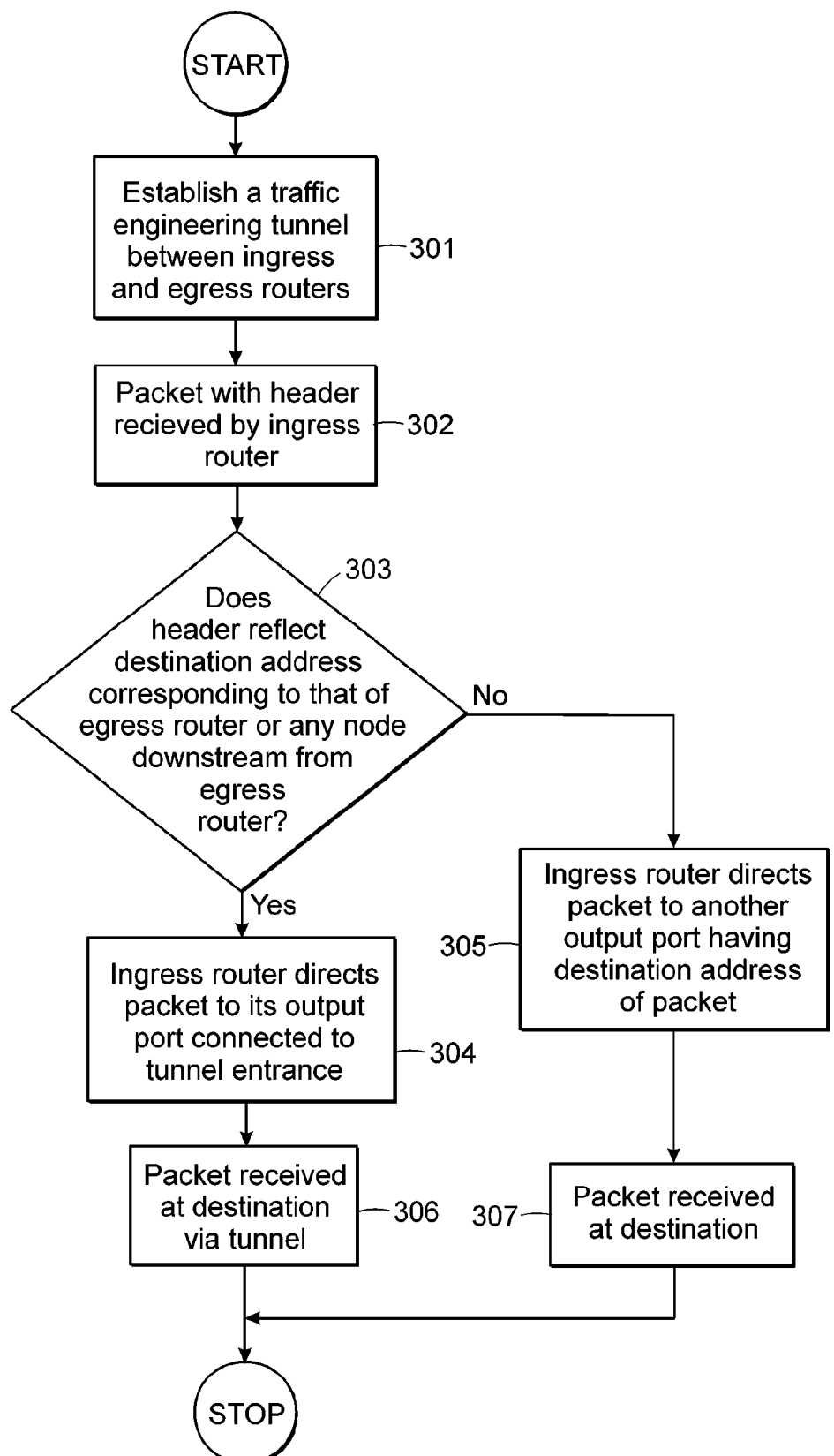
FIG. 3 is a flowchart illustrating the prior art approach to usage of tunnels in information communication networks.

Preliminarily, the various subheadings provided hereinbelow are intended for general guidance and organizational purposes only, and are not intended to be limiting in any respect whatsoever. Accordingly, subject matter under any one subheading might appear under any one or more other subheadings.

FIG. 1

Referring to FIG. 1, there is depicted an information communication network including multiple routers A, B, C, D, E, and F as well as subnets 107 and 108 connected by various links. More specifically, ingress or head-end router A101 is shown with an input 125 which receives traffic or information or generic packet 123 (more detail about these packets is discussed in connection with FIG. 2A). Router A101 may have many output ports but shows only two output ports or interfaces 1 and 2 connected by link 110 to router B102 and link 109 to router C104 respectively. Link 109 is depicted as a tunnel and link 110 is depicted as other than a tunnel and could be a link based on OSPF (Open Shortest Path First) or some other protocol. Router B102 is connected via link 110 to tail-end or egress router E. Router C104 is connected via tunnel 109 to router D105 which, in turn, is connected via tunnel 109 also to tail-end router E103. Thus, there are two pathways shown between ingress and egress routers in this Fig., one being a tunnel and the other not being a tunnel. Finally, Router E103 indirectly connects to subnet 108 through router F106 via links 112 and 113 (two hop counts in certain protocols), but router E103 directly connects to subnet 107 via link 111 (one hop count in certain protocols). Each subnet is an autonomous network and would typically contain routers, switches, host computers and other network nodes, each such item having its own address within its autonomous network.

As is understood by those familiar with this art, a tunnel involves technology that enables a first network to send its data by way of another network's connections, typically by encapsulating a first network's protocol within packets carried by the second network. For example, one can employ MPLS which is an integration of Layer 2 and Layer 3 technologies and uses labels which override the destination addresses of the packets. Thus, a hard-coded communication pathway is created based on these labels having a particular destination and such pathway is called a "label-switched path (LSP) tunnel". Any routers internal to such tunnel may be directly accessed by other routers in the network to perform routing functions independent of their otherwise dedicated usage as transit routers within the tunnel.

Also, as understood by those familiar with this art, there are various protocols that have been adopted for exchanging routing information within a LAN and between multiple LANs within the same AS. These are known as interior gateway protocols (IGPs). OSPF and RIP are example IGPs that can be used to exchange routing information within an autonomous system (AS) or LAN such as within subnet 107 or within subnet 108. OSPF establishes links throughout the network by having routers broadcast individual link metric information to all other routers. This is contrasted with RIP that establishes links throughout the network by having routers advertise their data to only neighboring routers which, in turn, pass on the information only to successive neighboring routers. The former class is called link state routing protocols and the latter class is called distance-vector protocols. The tunnel of FIG. 1 can be constructed as an LSP tunnel and the other links shown can be constructed in accordance with an IGP.

FIG. 2A

FIG. 2A shows certain characteristics of a number of packets 114, 117, 121, and 122. In actuality, each packet, including the packets 114, 117, 121, 122, and 123 (shown in FIG. 1), includes a destination address field indicating the final destination of the packet, a source address field ("FROM") indicating the source of the packet, and a data payload. Each packet typically passes through a number of routers along the way from the source to the destination. Specifically, each router determines a "next hop" router for each packet, and forwards the packet to the "next hop" router. For convenience, FIG. 2A shows a "TO" field representing the "next hop" router for each packet. It should be noted that the "TO" field is not an actual field within the packets. For packets 114, 117, 121, and 122, the "FROM" field and the "PAYLOAD" field are left blank, since these fields are not germane to comprehension of the described embodiments of the present invention. In packet 114, the "TO" field shows router A101 and the destination address field shows "Internal Subnet 107." This packet information is interpreted as follows: the packet came from some unknown upstream network node and was sent to Router A101 as the "next hop" router. Router A101 forwards or routes the packet toward a particular node internal to subnet 107 for which a specific address is provided in this packet's header and depicted herein as "Internal Subnet 107". The payload field contains whatever data (binary 1's and 0's) is intended for that particular node destination. Packet 117 contains similar information in its fields, but its destination address is different from that of packet 114—packet 117 is destined for a particular node internal to or within autonomous subnet 108. Such particular node's address is intended to be represented by "Internal Subnet 108" in this illustration. Packets 121 and 122 differ from packets 114 and 117 primarily in their respective destination addresses, where packets 121 and 122 are destined for tunnel tail-end router E103 and router F106 respectively, rather than nodes within the subnets 107 and 108. Further detailed discussion of these packets will be presented hereinbelow.

FIGS. 2B & 2C

Referring next to both FIGS. 2B and 2C, FIG. 2B shows a prior art map table for purposes of comparison with FIG. 2C, which reflects a map table in conformance with principles of the present invention. These tables pictorially represent functional essence of operation of certain computer hardware, firmware and/or software in router A101 of FIG. 1 and are thus tables of binary numbers or binary values. However, such values are not shown but are represented by their functional equivalents in English language and decimal numbers to enhance comprehension of the various embodiments of the present invention. A table representation similar to these, but with different information, can be associated with each router of the network of FIG. 1. These tables show columns entitled "Packet number" and "Forwarding Entry". Packet number is not necessarily an item maintained in these mapping or router tables, and is shown here as a convenient identifier for discussion purposes. On the other hand, Forwarding Entry including its sub-columns entitled "Destination Address" (DA), "Outgoing Interface" and "Label Added?" are included in the router tables for substantive operational purposes. "The first column and first row or tuple entry in the tables is packet 114 and is similar to the generic packet 123 depicted in FIG. 1. Corresponding to packet 114 is a destination address binary value corresponding to a particular node within subnet 107, an outgoing interface binary value corresponding to interface or port #2 of router A101, and a binary value corresponding to answer "yes" to the question of whether or not a label is added to this packet. Similar binary values are associated with the table entries for the other packets shown.

With specific regard to prior art FIG. 2B, packets 114 through 122 are shown having destination addresses of either subnet 107, subnet 108, router E103 or router F106. (As noted earlier, a designation of "subnet 107" for destination address means a particular node within subnet 107 and is illustrated in this manner for purposes of convenience, since the internals of subnet 107 are not shown in order to enhance clarity of presentation. Thus the repetitive destination address designation of "subnet 107" also for packet numbers 115, 116, and 118 may mean either the same node as—or different nodes from—the particular node within subnet 107 to which packet 114 is destined.) As can be seen, in FIG. 2A, all packets exit router A101 via outgoing interface or port #2 and all have a label added. All of these packets are said to belong to the same forwarding equivalence class (FEC), since they all exit the router by way of the same port with the same label. In typical router construction, there are multiple printed circuit boards or "cards" associated with the multiplicity of outgoing interfaces or ports in the router, and a card may have more than one port associated with it. Further discussion of router construction detail at this level, however, is not essential to full comprehension of the presented embodiments of the present invention.

Next, with specific regard to FIG. 2C, a map table in accordance with principles reflected in embodiments of the present invention is shown. A principal difference between this table and the one of FIG. 2B is the indication that nodes having destination addresses within subnet 108, such as those associated with packets 117, 119, and 120, all do not have labels added, and all are routed out outgoing interface #1 instead of interface #2. Thus, rather than have all incoming packets that are destined for addresses downstream of router E103 go out interface #2 (to the tunnel entrance), now, in accordance with principles of the present invention, only certain incoming packets (a subset of the incoming packets) that are destined for addresses downstream of router E103 go out interface #2.

FIGS. 1, 2A, 2B, 2C—Operation

In operation, referring to FIGS. 1, 2A, 2B, and 2C collectively, traffic or packets, such as packet 114, are serially received by head-end router A101 at input 125. Packet 114 would ordinarily contain header information which would show (in the "FROM" field of the header) where it came from (either a local device within this particular LAN or AS or from a different or remote LAN or AS via a network "gateway"). The header also shows where the packet is heading to (in the "DESTINATION ADDRESS" field of the header), which, in this case, is a node within internal subnet 107. Upon receipt of this packet, router A101 examines the packet's destination address, and compares the packet's destination address against destination address entries in the table of FIG. 2C. (For purposes of enhancing clarity of presentation, a limited number of only nine entries are presented in the tables of FIG. 2B and FIG. 2C, those entries all being related to tail-end routers and downstream routers E103 and F106 respectively, and depicted subnets 107/108. It should be understood, however, that the network can be much larger than that shown, with a vast number of subnets and/or network devices and host computers, and with a corresponding vast number of destination addresses). A match is found between the arriving packet's destination address and a destination address entry in the table, i.e. a node within subnet 107. Thus, the first row or tuple of the table of FIG. 2C represents a matched association between the binary-numbered destination address contained in packet 114 entered in the first column, and the binary numbered address of a particular node within subnet 107 stored in the first row, second column headed "Destination Address." The hardware, firmware, and/or software of router A101 represented by this table thus responds by affixing the computer binary equivalent of a label to this particular packet and forwarding it to outgoing interface "2" as reflected in the first row or tuple of the table. Outgoing interface or port 2 is the entrance to tunnel 109 by which packet 114 travels to router C104. Router C104 receives the packet and does not examine its destination address like router A101 did, but relatively quickly (as compared with the prior address examination procedure) notes its label and forwards it along the tunnel based on the label information. Router D105 receives the labeled packet and performs the same procedure as router C104 and quickly forwards it to tail-end router E103. Router E103 removes the label and forwards the packet to a particular node within subnet 107 over link 111 based on its original destination address. Other packets similarly destined, namely packets 115, 116 and 118, are handled in an identical fashion, and their entries in FIG. 2C also represent matched associations between each of their destination addresses in their respective headers and a matching binary number address of a particular node internal to subnet 107 stored in the FIG. 2C table of router A101 (which may or may not be the same address to which the destination of packet 114 was matched). Thus, packets destined for various nodes internal to subnet 107 being directly connected from tunnel egress router E103 are sent by way of the tunnel.

In contrast, consider the operation of this network upon a different packet, packet 117, which has a different destination address. In FIGS. 1, 2A and 2C, generic packet 123 can also represent packet 117 being received by router A101, but in this case showing a different destination address of "Internal Subnet 108" in its destination address field. Thus router A101, as with aforementioned packets 114, 115, 116, and 118, again proceeds with the relatively lengthy procedure of examining this new packet's destination address and comparing it against destination address entries in its table. As before, a match is found between the destination address of packet 117 and, in this case, a particular node within subnet 108, as reflected in the fourth row or tuple of the table in FIG. 2C, counting from the top down. Thus, this fourth tuple represents a matched association between the destination address (binary numbered) contained in packet 117 shown in the first column and the address (binary number) of such particular node within subnet 108 stored in the table of router A101 shown in the second column headed "Destination Address." Hardware, firmware, and/or software represented by the table responds, in this case, by not affixing the computer binary equivalent of a label to this particular packet, but by merely forwarding it to a different outgoing interface, port "1" based on its destination address as shown in this fourth tuple. Outgoing interface or port 1 is the entrance to link 110 by which packet 117 travels to router B102. Router B102 receives the packet and in this case (without a label) must reexamine the packet's destination address like router A101 did. Thereafter, router B101 forwards the packet along to router E103 based on the destination address. Router E103 again reexamines the address and forwards the packet to router F106 over link 112. Router F106 examines the packet's destination address and forwards the packet over link 113 to some node having such destination address internal to subnet 108. Packets 119 and 120 are handled in like fashion since they are also destined to internal subnet 108. Thus, packets destined for nodes, routers, hosts, etc. within subnet 108, which is indirectly connected from tunnel egress router E, are sent by routes other than through the tunnel. Packet numbers 121 and 122 reflect packets destined for routers upstream from the subnets; one of these routers is the tail-end router and the other is directly supported thereby, whereby packets so destined are labeled and proceed via the tunnel.

If the tables of FIGS. 2B and 2C did not have label columns they could have been called generic routing tables. The added label column converts each table to what is known as a traffic engineered (TE) tunnel table, since addition of labels contribute to creation of the tunnel. Another way of describing implementation of this embodiment of the present invention is that each router maintains a table of traffic-engineered tunnels that originate on that router. After shortest path first (SPF) calculations have been completed by each router and routes submitted to its routing table, interior gateway protocol (IGP) examines the TE tunnel table and finds all the tail-end routers for tunnels originating on this calculating router. This is done for each router. For each tail-end router found, the link state database is examined to find all subnets directly attached to that tail-end router. For each of these directly attached subnets, a route is submitted to its head-end router's TE tunnel table with the tunnel as "next hop". The labels that are ultimately affixed to those incoming packets which are properly destined take this next hop information into account.

FIG. 5—Metrics

Figure 5:
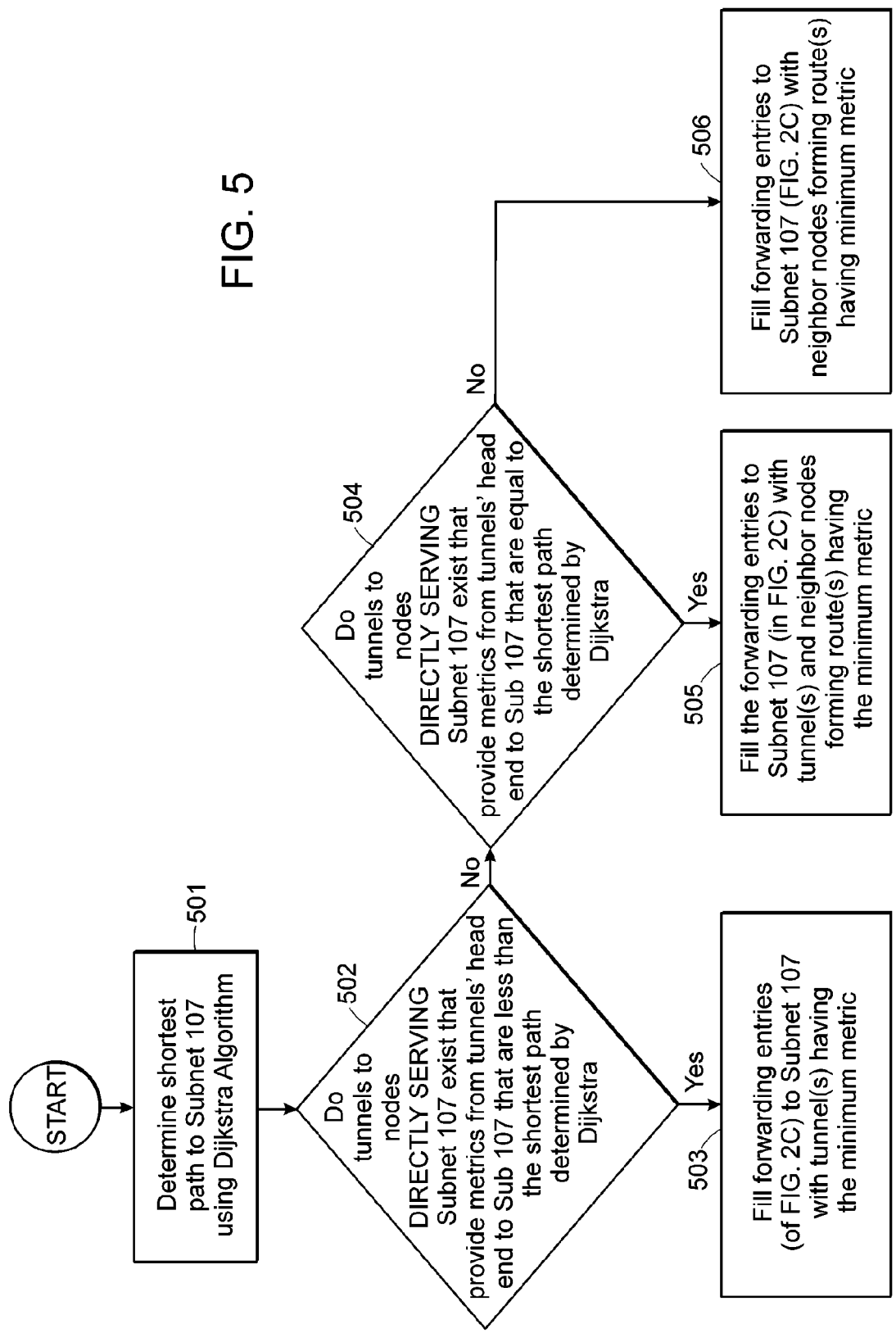
FIG. 5 is a flowchart illustrating an algorithm utilized in the process of filling the table entries in accordance with another embodiment of the present invention; and, FIG. 6 is a flowchart illustrating an algorithm associated with a system for controlling level or volume of tunnel traffic in accordance with principles of the present invention.

For further explanation with regard to implementation of the table of FIG. 2C, reflecting an exemplary embodiment of the present invention, refer to FIG. 5 which is a flowchart illustrating metrics involved. Metrics can be viewed as effective "distances" or "loads" between nodes, such effective distances taking into account other factors such as traffic congestion, transmission speed of the physical media (e.g. copper vs glass fiber), etc. All of this information is available to each of the routers in the network which can broadcast such information to all other routers in the network under certain protocols. In block 501, head-end router A101 of FIG. 1 determines the shortest path to subnet 107 using the "Dijkstra" algorithm (see almost any text on computer networks, such as "Computer Networks" by Andrew S. Tanenbaum published by Prentice Hall). The algorithmic process then moves to decision block 502 which determines if any tunnels exist that directly serve subnet 107 (i.e. that have their respective tail-ends on separate routers such as E103 that directly serve subnet 107) that provide metrics from router A101 to the subnet that are less than the shortest path determined in block 501. If "yes", the algorithmic process moves to block 503 reflecting that all such tunnel(s) having the minimum metric are the forwarding entries that fill the table of FIG. 2C. Thus other existing tunnels, if any, directly serving subnet 107 but having metrics greater than the minimum tunnel metric determined are not entered into the table. On the other hand, if the answer to decision block 502 was "no", where no tunnels in that category exist, then the process moves to a second decision block 504 where the same question is posed with regard to directly serving subnet 107 but only for tunnels having metrics that are equal to the shortest path determined. If the answer to this second question is "yes", then in block 505 the table in FIG. 2C is filled with forwarding entries to subnet 107 comprising tunnel(s) and neighbor nodes (if any) forming route(s) having the minimum metric (in this case equal to the Dijkstra-determined shortest path metric). Finally, if the answer to this second question is "no", then in block 506 the routing or mapping table of FIG. 2C is filled with forwarding entries to subnet 107 comprised of only neighbor nodes (non-tunnel nodes) forming route(s) having the minimum Dijkstra-determined metric. (By contrast, the prior art approach would be reflected in decision blocks that are similar as far as the metrics comparison is concerned, but are quite different in that they would ignore the "directly-serve" concept. Thus, the prior art decision blocks would form routes including tunnels that would accept traffic destined for all nodes downstream from the tail-end router.) It is understood that, in this embodiment of the present invention, this process of filling a routing table of a particular head-end router with forwarding entries is one that is performed in advance of any packets arriving at the input to such router. In other words, in this embodiment of the present invention, this is a static, pre-determined process, established in advance of packet-arrival to handle packets arriving thereafter.

Figure 4:
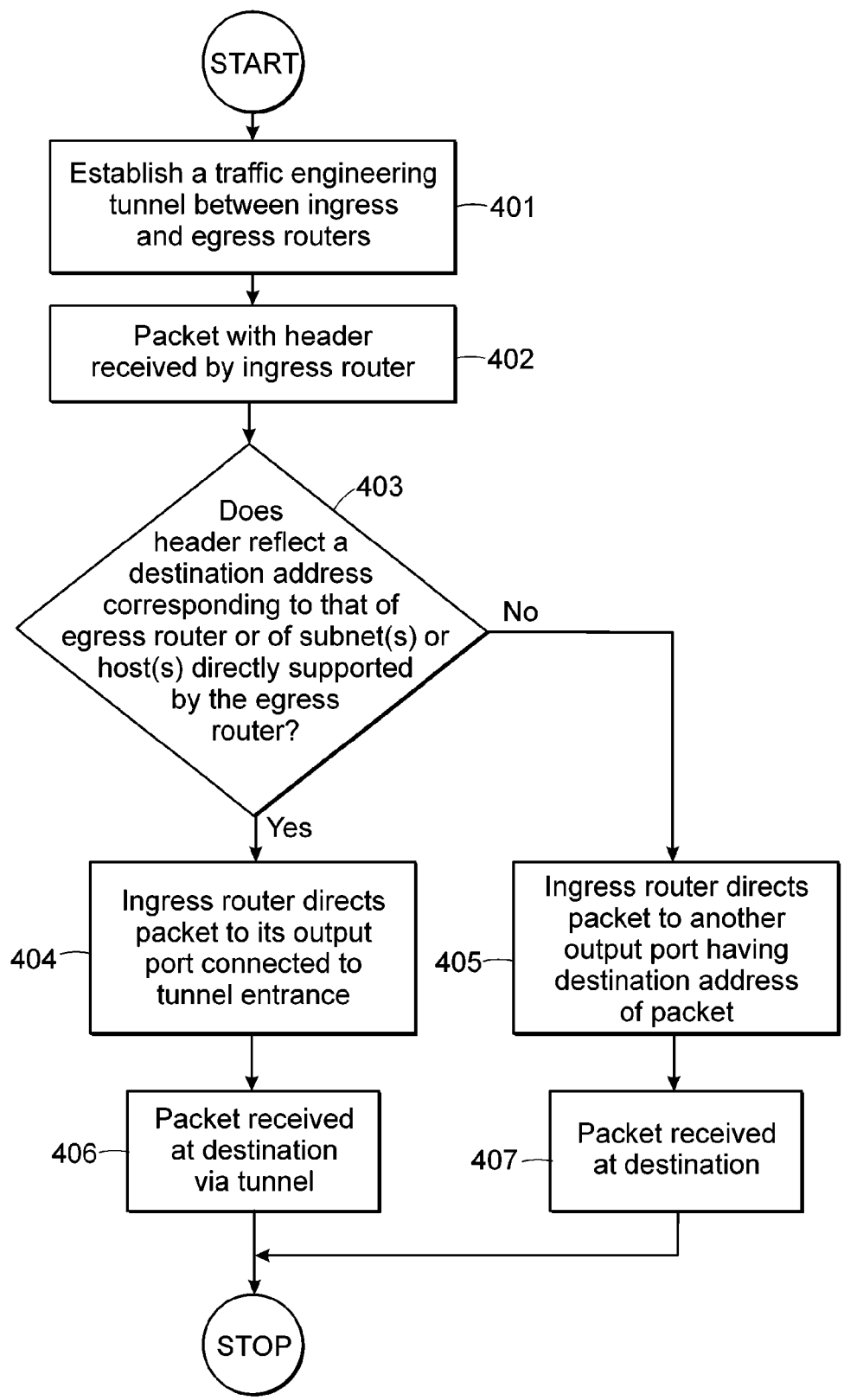
FIG. 4 is a flowchart illustrating an algorithm utilized by an embodiment of the present invention.

FIGS. 3 & 4—Dynamic Implementation

As an alternative embodiment of the present invention, consider a dynamic approach to implementation of the present invention. But first, refer to the flowchart of FIG. 3; while reflecting a dynamic approach this FIG. 3 does not reflect embodiments of the present invention. The algorithm starts with a tunnel being established in block 301. The algorithmic process moves to block 302 where a packet with a header is received by the ingress router. The algorithmic process moves to decision block 303, which dynamically determines if the packet's destination address corresponds to that of the tunnel's egress router or any node downstream from such egress router. If the answer is "yes", then the algorithmic process goes to block 304 where the ingress router directs such packet(s) to its output port, which is linked to the tunnel's entrance. From there the algorithmic process moves to block 306 where the packet(s) is received at the destination via the tunnel. Thus all traffic to the egress router and downstream therefrom is jammed into the tunnel. On the other hand, if the answer is "no", then the process moves from decision block 303 to block 305 where the ingress router directs the packet to another output port having the destination address of the packet(s). From there the process moves to block 307 where the packet is received at the destination, but not via the tunnel.

By contrast, consider the algorithmic process of the flowchart of FIG. 4, which does reflect a dynamically-responsive embodiment of the present invention. A tunnel is established in block 401 between ingress and egress routers. A packet with header is received by the ingress router in block 402. The algorithmic process moves to decision block 403, which dynamically determines if the header reflects a destination address corresponding to the egress router or of subnet(s) or host(s) directly supported by the egress router, thus limiting the traffic through the tunnel to this subset of downstream addresses. If the answer is "yes" then the algorithmic process moves to block 404 where the ingress router directs such packet(s) to its output port that is connected to the tunnel entrance. The process moves from there to block 406 where the packet(s) is received at the destination via the tunnel. On the other hand, if the answer is "no", then the algorithmic process moves from block 403 to block 405 where the ingress router directs the packet(s) to another output port (not connected to the tunnel) and having the destination address of the packet(s). From block 405 the process moves to block 407 where the packet is received at its destination (not via the tunnel). In this case traffic through the tunnel is limited providing the operational network benefits earlier described. As noted, this approach dynamically solves the problem on a packet-by-packet basis, where decision block 403 is a dynamic operation in real time, as compared with the earlier-described embodiment of pre-determining all addresses of all downstream nodes and entering that information in a table in advance of packet-arrival.

Figure 6:
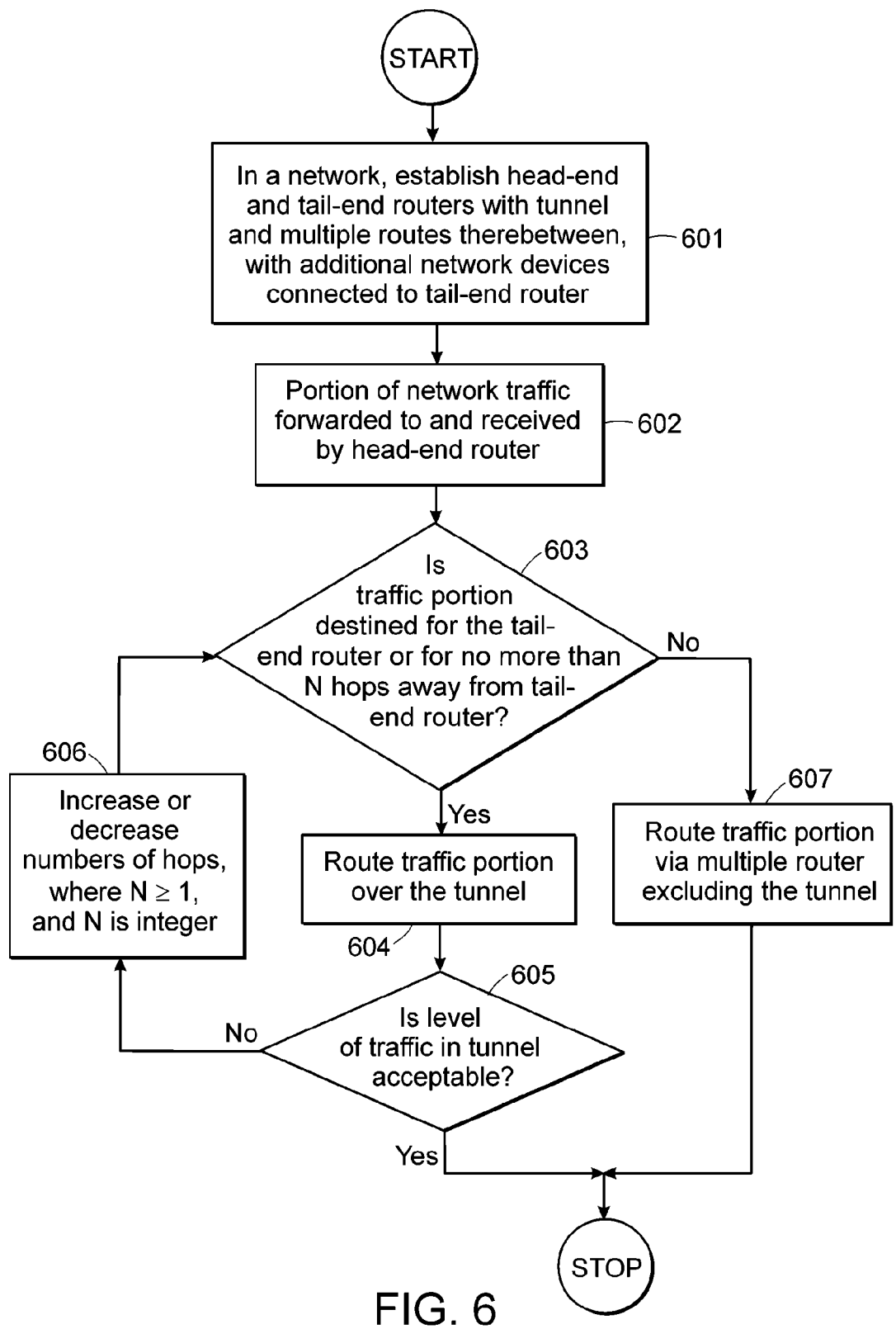

FIG. 6—Dynamic Control

For another alternative embodiment in the category of dynamic control of tunnel traffic in a network, consider FIG. 6. In block 601, within a network, establish a head-end router (e.g. A101 in FIG. 1) connecting to a tail-end router (e.g. E103 in FIG. 1) by way of both a tunnel and multiple non-tunnel routes; there are additional network devices connected to the tail-end router. The algorithmic process moves to block 602 where a particular portion of the network traffic (portion of the packets routed and transmitted throughout the network) is forwarded to and received by the head-end router. The algorithmic process moves next to decision block 603 wherein a determination is made: is such particular portion of received network traffic destined for the tail-end router or for nodes no more than N hops (N is an integer greater than or equal to a value of one) away from the tail-end router? If the answer is "yes", then in block 604 such particular traffic portion is conducted to a particular output port on the head-end router so that it is routed over or through the tunnel. Then, the algorithmic process moves to decision block 605 wherein it is determined if the level of traffic in the tunnel is acceptable, i.e., is the traffic too light where more traffic could be easily handled, or, on the other hand, is there congestion or instability or other adverse condition detected in the tunnel? If the answer is "no", that the traffic level is not acceptable, then the process moves to control block 606, which either increases or decreases the number "N" to adjust the subset of downstream network nodes that are included in the group having addresses to which tunnel traffic will be forwarded. This group of addresses is thus either increased or decreased by adjusting the number N upwards or downwards respectively, with a lower limit to its value being N=1 and by feeding-back its adjusted value into decision block 603 where the operation of block 603 is repeated, but now with respect to this adjusted value of N. (In other words, this is a dynamic feedback operation where the subset of addresses of nodes located downstream from the tail-end router of a tunnel to which tunnel traffic is being routed or forwarded is adjusted up or down to maintain an optimum level of traffic within the tunnel.) Assuming that this adjusted value of N results in another "yes" answer from block 603, then the concomitant adjusted traffic level is routed over the tunnel in block 604. On this iteration, if level of traffic in the tunnel is now acceptable (contrasted with the prior "no" answer) according to block 605, the algorithmic process moves via its "yes" output and stops.

On the other hand, returning to decision block 603, if the traffic portion received by the head-end router was not destined for the tail-end router or was not within N hops of the tail-end router, then the algorithmic process moves to block 607 wherein such traffic portion is conducted to head-end router output ports connected to multiple routes excluding the tunnel, and again the algorithmic process stops. In this manner traffic in the tunnel is clearly controlled under two conditions: (1) As noted in embodiments earlier described, if traffic is destined for downstream nodes that are outside of the subset of nodes established for servicing by the tunnel (e.g. not within the class of nodes that are directly supported by the tunnel's egress router representing under certain protocols a "one-hop" condition or a value of N=1) then such destined traffic is conducted to head-end router output ports that route such traffic outside the tunnel; and (2) If the first condition is met, where the traffic is destined for downstream nodes that are inside such subset, then such traffic in the tunnel is dynamically adjusted to maintain an optimum traffic level or volume for that tunnel, optimum being determined within the context of traffic distribution throughout the entire network.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the head-end device logic is implemented as a set of computer program instructions that is converted into a computer executable form, stored as such in a computer readable medium, and executed by a microprocessor within the head-end device under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Although various exemplary embodiments of the invention have been disclosed and described, it should be apparent to those skilled in the art that various changes and modifications can be made that will achieve some of the advantages of the invention without departing from the true scope of the invention. The present embodiments are thus to be considered as illustrative and not restrictive. These and other such modifications are intended to be covered by the appended claims.

We claim:

1. In an information communication network comprising a head-end device in communication with a tail-end device via a number of routes for routing information to various destinations, a method for limiting traffic volume in a tunnel by said head-end device, the method comprising:

establishing said tunnel to said tail-end device as one of said number of routes;

determining a number of said destinations within a predetermined number of hops of said tail-end device to identify serviced destinations, wherein the predetermined number is at least one; and selectively routing only information destined for said serviced destinations through said tunnel.

2. The method of claim 1, wherein said serviced destinations comprise directly-connected hosts/subnets of said tail-end device.

3. The method of claim 1, further comprising monitoring tunnel utilization, wherein said determining further comprises dynamically increasing said predetermined number of router hops if said tunnel is under-utilized and decreasing said predetermined number of router hops if said tunnel is over-utilized.

4. The method of claim 1, wherein said serviced destinations comprise said tail-end device.

5. The method of claim 1, wherein said serviced destinations comprise a destination for which said tunnel is a better route to said destination than a predetermined shortest path route to said destination.

6. The method of claim 5, wherein said determining comprises:

calculating said shortest path route to said destination;

determining a shortest path route metric associate with said shortest path route;

determining a tunnel metric associated with said tunnel; and determining from said shortest path route metric and said tunnel metric that said tunnel is a better route to said destination than said shortest path route.

7. The method of claim 1, wherein said head-end device comprises a link state database, and wherein said determining comprises examining said link state database to determine which of said destinations are serviced by said tail-end device.

8. The method of claim 1, wherein said tunnel comprises a label switched path from said head-end device to said tail-end device, and wherein said routing comprises affixing to said information a predetermined label associated with said label switched path for label switching of said information from said head-end device to said tail-end device by a number of intermediate devices.

9. The method of claim 1, wherein said head-end device comprises a forwarding table indicating one of said number of routes for each of said number of destinations, and wherein said determining further comprises indicating said tunnel for each of said serviced destinations in said forwarding table.

10. The method of claim 9, wherein said routing comprises determining from said forwarding table that said information is associated with said tunnel.

11. The method of claim 1, further comprising routing information destined for other than said serviced destinations over one of said number of routes other than said tunnel.

12. An apparatus for limiting traffic volume in a tunnel between said apparatus and a tail-end device, said apparatus having a number of routes to said tail-end for routing information to various destinations, the apparatus comprising:

tunnel establishment logic operably coupled to establish said tunnel to said tail-end device as one of said number of routes;

determination logic operably coupled to determine a number of said destinations that are within a predetermined number of hops of said tail-end device to identify serviced destinations, wherein the predetermined number is at least one; and routing logic operably coupled to selectively route information destined only for said serviced destinations to said tail-end device through said tunnel.

13. The apparatus of claim 12, wherein said serviced destinations comprise directly-connected hosts/subnets of said tail-end device.

14. The apparatus of claim 12, further comprising monitoring tunnel utilization, wherein said determination logic is operably coupled to dynamically increase said predetermined number of router hops if said tunnel is under-utilized and decrease said predetermined number of router hops if said tunnel is over-utilized.

15. The apparatus of claim 12, wherein said serviced destinations comprise said tail-end device.

16. The apparatus of claim 12, wherein said serviced destinations comprise a destination for which said tunnel is a better route to said destination than a predetermined shortest path route to said destination.

17. The apparatus of claim 16, wherein said determination logic is operably coupled to calculate said shortest path route to said destination;
determine a shortest path route metric associate with said shortest path route;
determine a tunnel metric associated with said tunnel; and
determine from said shortest path route metric and said tunnel metric that said tunnel is a better route to said destination than said shortest path route.

18. The apparatus of claim 12, further comprising a link state database, and wherein said determination logic is operably coupled to examine said link state database to determine which of said destinations are serviced by said tail-end device.

19. The apparatus of claim 12, wherein said tunnel comprises a label switched path from said head-end device to said tail-end device, and wherein said routing logic is operably coupled to affix to said information a predetermined label associated with said label switched path for label switching of said information from said head-end device to said tail-end device by a number of intermediate devices.

20. The apparatus of claim 12, further comprising a forwarding table indicating one of said number of routes for each of said number of destinations, and wherein said determination logic is operably coupled to indicate said tunnel for each of said serviced destinations in said forwarding table.

21. The apparatus of claim 20, wherein said routing logic is operably coupled to determine from said forwarding table that said information is associated with said tunnel.

22. The apparatus of claim 12, wherein said routing logic is operably coupled to route information destined for other than said serviced destinations over one of said number of routes other than said tunnel.

23. A computer-readable medium containing program for controlling a head-end device to limit traffic volume in a tunnel between said apparatus and a tail-end device, said apparatus having a number of routes to said tail-end for routing information to various destinations, the computer program comprising:
tunnel establishment logic programmed to establish said tunnel to said tail-end device as one of said number of routes;

determination logic programmed to determine a number of said destinations that are within a predetermined number of hops of said tail-end device to identify serviced destinations, wherein the predetermined number is at least one; and routing logic programmed to selectively route only information destined for said serviced destinations to said tail-end device through said tunnel.

24. The computer program of claim 23, wherein said serviced destinations comprise directly-connected hosts/subnets of said tail-end device.

25. The computer program of claim 23, further comprising monitoring logic programmed to monitor tunnel utilization, wherein said determination logic is further programmed to dynamically increase said predetermined number of router hops if said tunnel is under-utilized and decrease said predetermined number of router hops if said tunnel is over-utilized.

26. The computer program of claim 23, wherein said serviced destinations comprise said tail-end device.

27. The computer program of claim 23, wherein said serviced destinations comprise a destination for which said tunnel is a better route to said destination than a predetermined shortest path route to said destination.

28. The computer program of claim 27, wherein said determination logic is programmed to calculate said shortest path route to said destination;
determine a shortest path route metric associate with said shortest path route;
determine a tunnel metric associated with said tunnel; and
determine from said shortest path route metric and said tunnel metric that said tunnel is a better route to said destination than said shortest path route.

29. The computer program of claim 28, wherein said determination logic is programmed to examine a link state database to determine which of said destinations are serviced by said tail-end device.

30. The computer program of claim 23, wherein said tunnel comprises a label switched path from said head-end device to said tail-end device, and wherein said routing logic is programmed to affix to said information a predetermined label associated with said label switched path for label switching of said information from said head-end device to said tail-end device by a number of intermediate devices.

31. The computer program of claim 23, further comprising a forwarding table indicating one of said number of routes for each of said number of destinations, and wherein said determination logic is programmed to indicate said tunnel for each of said serviced destinations in said forwarding table.

32. The computer program of claim 31, wherein said routing logic is programmed to determine from said forwarding table that said information is associated with said tunnel.

33. The computer program of claim 23, wherein said routing logic is programmed to route information destined for other than said serviced destinations over one of said number of routes other than said tunnel.

34. The computer program of claim 23 embodied in a computer readable medium.

35. The computer program of claim 23 embodied as a data signal.

36. In an information communication network comprising a head-end device in communication with a tail-end device via a number of routes for routing information to various destinations, a method for limiting traffic volume in a tunnel, the method comprising:

establishing said tunnel between said head-end device and said tail-end device as one of said number of routes;

receiving information for a destination by said head-end device;

determining whether said destination is within a predetermined number of hops of said tail-end device to determine whether the destination is a serviced destination, wherein the predetermined number is greater than or equal to one; and selectively routing said information by said head-end device to said tail-end device over said tunnel, if and only if said destination is a serviced destination.

37. The method of claim 36, wherein determining whether said destination is serviced by said tail-end device comprises determining whether said destination is a directly-connected host/subnet of said tail-end device.

38. The method of claim 36, further comprising monitoring tunnel utilization, wherein said determining further comprises dynamically increasing said predetermined number of router hops if said tunnel is under-utilized and decreasing said predetermined number of router hops if said tunnel is over-utilized.

39. The method of claim 36, wherein said destination is serviced by said tail-end device comprises determining whether said destination is said tail-end device.

40. The method of claim 36, wherein determining whether said destination is serviced by said tail-end device comprises:

calculating a shortest path route to said destination;

determining a shortest path route metric associate with said shortest path route;

determining a tunnel metric associated with said tunnel; and determining from said shortest path route metric and said tunnel metric that said tunnel is a better route to said destination than said shortest path route;

said serviced destinations comprise a destination for which said tunnel is a better route to said destination than a predetermined shortest path route to said destination.

41. The method of claim 36, wherein said head-end device comprises a link state database, and wherein said determining comprises examining said link state database to determine which of said destinations are serviced by said tail-end device.

42. The method of claim 36, wherein said tunnel comprises a label switched path from said head-end device to said tail-end device, and wherein said routing comprises affixing to said information a predetermined label associated with said label switched path for label switching of said information from said head-end device to said tail-end device by a number of intermediate devices.

43. The method of claim 42, wherein said routing further comprises said tail-end device removing said label from said information and forwarding said information to said destinations based upon destination address information in said information.

44. The method of claim 36, further comprising routing said information by said head-end device to said tail-end device over one of said routes other than said tunnel, if and only if said destination is not serviced by said tail-end device.

45. An apparatus for limiting traffic volume in a tunnel between said apparatus and a tail-end device, said apparatus having a number of routes to said tail-end for routing information to various destinations, the apparatus comprising:

tunnel establishment logic operably coupled to establish said tunnel to said tail-end device as one of said number of routes;

receiving logic operably coupled to receive information for a destination;

determination logic operably coupled to determine whether said destination is serviced by said tail-end device responsive to said destination being within a predetermined number of hops of said tail-end device, wherein the predetermined number is at least one; and routing logic operably coupled to selectively route said information to said tail-end device through said tunnel if and only if said destination is service by said tail-end device.

46. The apparatus of claim 45, wherein said determination logic is operably coupled to determine whether said destination is a directly-connected host/subnet of said tail-end device.

47. The apparatus of claim 45, further comprising monitoring logic operably coupled to monitor tunnel utilization, wherein said determination logic is operably coupled to dynamically increase said predetermined number of router hops if said tunnel is under-utilized and decrease said predetermined number of router hops if said tunnel is over-utilized.

48. The apparatus of claim 45, wherein said determination logic is operably coupled to determine whether said destination is said tail-end device.

49. The apparatus of claim 45, wherein said determination logic is operably coupled to calculate said shortest path route to said destination, determine a shortest path route metric associate with said shortest path route, determine a tunnel metric associated with said tunnel, and determine from said shortest path route metric and said tunnel metric that said tunnel is a better route to said destination than said shortest path route.

50. The apparatus of claim 45, further comprising a link state database, wherein said determination logic is operably coupled to examine said link state database to determine which of said destinations are serviced by said tail-end device.

51. The apparatus of claim 45, wherein said tunnel comprises a label switched path to said tail-end device, and wherein said routing logic is operably coupled to affix to said information a predetermined label associated with said label switched path for label switching of said information from said head-end device to said tail-end device by a number of intermediate devices.

52. The apparatus of claim 45, wherein said routing logic is operably coupled to route said information to said tail-end device over one of said routes other than said tunnel, if and only if said destination is not serviced by said tail end device.

53. A computer-readable medium containing program for controlling a head-end device to limit traffic volume in a tunnel between said head-end device and a tail-end device, said head-end device having a number of routes to said tail-end for routing information to various destination, the computer program comprising:

tunnel establishment logic programmed to establish said tunnel to said tail-end device as one of said number of routes;

receiving logic programmed to receive information for a destination;

determination logic programmed to determine whether said destination is serviced by said tail-end device responsive to the destination being within a predetermined number of hops of the tail-end device, wherein the predetermined number is at least one; and routing logic programmed to selectively route said information to said tail-end device through said tunnel if and only if said destination is serviced by said tail-end device.

54. The apparatus of claim 53, wherein said determination logic is programmed to determine whether said destination is a directly-connected host/subnet of said tail-end device.

55. The computer program of claim 53, further comprising monitoring logic programmed to monitor tunnel utilization, wherein said determination logic is programmed to dynamically increase said predetermined number of router hops if said tunnel is under-utilized and decrease said predetermined number of router hops if said tunnel is over-utilized.

56. The computer program of claim 54, wherein said determination logic is programmed to determine whether said destination is said tail-end device.

57. The computer program of claim 54, wherein said determination logic is programmed to calculate said shortest path route to said destination;

determine a shortest path route metric associate with said shortest path route;

determine a tunnel metric associated with said tunnel; and determine from said shortest path route metric and said tunnel metric that said tunnel is a better route to said destination than said shortest path route.

58. The computer program of claim 54, wherein said determination logic is programmed to examine a link state database to determine which of said destinations are serviced by said tail-end device.

59. The computer program of claim 54, wherein said tunnel comprises a label switched path from said head-end device to said tail-end device, and wherein said routing logic is programmed to affix to said information a predetermined label associated with said label switched path for label switching of said information from said head-end device to said tail-end device by a number of intermediate devices.

60. The computer program of claim 54, wherein said routing logic is programmed to route said information to said tail-end device over one of said routes other than said tunnel, if and only if said destination is not serviced by said tail end device.

61. The computer program of claim 54 embodied in a computer readable medium.

62. The computer program of claim 54 embodied as a data signal.

63. A communication system comprising a head-end device in communication with a tail-end device via a number of routes including a tunnel for routing information to various destinations, wherein said head-end device is operably coupled to determine a number of said destinations that are serviced by said tail-end device and route information to said serviced destinations over said tunnel, wherein destinations are determined to be serviced by said tail-end device responsive to the destinations being within a predetermined number of hops of the tail-end device, wherein the predetermined number is at least one.

64. The communication system of claim 63, wherein said serviced destinations comprise directly-connected hosts/subnets of said tail-end device.

65. The communication system of claim 63, wherein said serviced destinations comprise said tail-end device.

66. The communication system of claim 63, wherein said serviced destinations comprise a destination for which said tunnel is a better route to said destination than a predetermined shortest path route to said destination.

67. The communication system of claim 63, wherein said tunnel comprises a label switched path from said head-end device to said tail-end device.

68. The communication system of claim 67, wherein said head-end device is operably coupled to affix to said information a predetermined label associated with said label switched path for label switching of said information from said head-end device to said tail-end device by a number of intermediate devices, and wherein said tail-end device is operably coupled to remove said label from said information and forward said information to said destinations based upon destination address information in said information.

69. The communication system of claim 63, wherein said head-end device is operably coupled to route information destined for other than said serviced destinations over one of said number of routes other than said tunnel.

* * * * *